United States Patent [19]

Prigent

[11] Patent Number: 4,592,071
[45] Date of Patent: May 27, 1986

[54] RECOVERY OF CARRIER AND CLOCK FREQUENCIES IN A PHASE OR AMPLITUDE STATE MODULATION AND COHERENT DEMODULATION DIGITAL TRANSMISSION SYSTEM

[76] Inventor: Jean-Pierre Prigent, rue de Verdun, 22300 Lannion, France

[21] Appl. No.: 597,065

[22] Filed: Apr. 4, 1984

[30] Foreign Application Priority Data

Apr. 12, 1983 [FR] France .................. 83 05942

[51] Int. Cl.⁴ .......................................... H03C 5/00
[52] U.S. Cl. ...................................... 375/42; 375/52; 375/81; 329/112
[58] Field of Search ............ 375/39, 52, 54, 81, 375/83, 97, 118, 42; 329/50, 104, 112, 122; 370/108

[56] References Cited

U.S. PATENT DOCUMENTS

| | | | |
|---|---|---|---|
| 3,470,477 | 9/1969 | Battail et al. .................. | 375/97 |
| 3,828,138 | 8/1974 | Fletcher et al. ................ | 375/97 |
| 3,919,651 | 11/1975 | Le Mouel ..................... | 375/97 |
| 4,275,465 | 6/1981 | Lemoussu ..................... | 375/58 |
| 4,328,587 | 5/1982 | Mizuno et al. ................. | 329/112 |
| 4,466,108 | 8/1984 | Rhodes ........................ | 329/112 |

Primary Examiner—Benedict V. Safourek
Assistant Examiner—Stephen Chin
Attorney, Agent, or Firm—Lowe, Price, Leblanc, Becker & Shur

[57] ABSTRACT

This invention aims at making a carrier wave synchronous with a clock signal provided with a digital signal in a modem transmitting part and at recovering a carrier wave having a phase coherent with the clock signal in a modem receiving part. The demodulated binary signal in the receiving part offers a reduced error rate since known transcoding operations in the transmitting and receiving parts are done away with. Noise immunity is also improved. The invention provides, in the receiving part receiving a modulation signal obtained by phase or amplitude state modulation in the transmitting part, a circuit for delaying the received signal by a delay equal to half a modulation period, a circuit for summing the received and delayed signals, a circuit for full-wave rectifying the summation signal, and a phase locked loop mainly including a sampling circuit, a phase comparator and a voltage controlled oscillator for recovering the carrier wave and the clock signal.

9 Claims, 9 Drawing Figures

RECOVERY OF CARRIER AND CLOCK FREQUENCIES IN A PHASE OR AMPLITUDE STATE MODULATION AND COHERENT DEMODULATION DIGITAL TRANSMISSION SYSTEM

BACKGROUND OF THE INVENTION

1. Field of the Invention

This invention relates to digital transmission system modems based on a carrier wave phase modulation with 2, 4 or 8 phase states. Nevertheless, this invention concerns also a carrier wave amplitude modulation with several amplitude states.

2. Description of the Prior Art

More particularly, the invention concerns an arrangement included in a modem for recovering carrier wave and clock frequencies in a digital transmission system. In a transmitting part are provided a binary signal associated with a clock signal and also a carrier wave having a frequency P given in a predetermined ratio n with the clock signal frequency 1/T. The carrier wave is phase or amplitude modulated by the binary signal into a modulation signal defined by $I=2^J$ phase or amplitude states corresponding to combinations of J successive bits in the modulating binary signal. In a receiving part is provided a phase locked loop designed to recover the frequency P of the carrier wave in the modulation signal with a view to phase or amplitude demodulating the modulation signal into the binary signal and to recovering the clock frequency.

In known transmission systems carrying out a phase-state modulation and a coherent demodulation, a carrier wave is generated by a local oscillator in a transmitting part of the system. The carrier wave has a phase undetermined with respect to clock signal provided with a binary information signal to be transmitted. The majority of carrier wave recovery means in known system receiving parts comprise a circuit for multiplying the modulation signal frequency by I so as to suppress the phase modulation and recover a signal having a pure frequency IP. A phase locked loop is usually designed to cue a voltage controlled oscillator to the frequency IP and to recover a carrier wave synchronous with the transmitting part carrier wave after dividing the pure frequency by I at an output from the phase locked loop. However, the phase of the recovered carrier wave is not determined with respect to the clock signal for subsequent demodulation of the received signal. Indeed, the phase of the carrier wave recovered at the output from the frequency divider is referred spontaneously on one of the I phases defined by the modulation.

To resolve any phase ambiguity in the receiving part and hence retrieve J-bit sequences of the binary signal respectively in terms of the corresponding phase states, use is made of a transcoding operation on J binary streams corresponding to the like-rank bits in the J-bit sequences of the binary signal. The transcoding operation can consist of a DPSK modulation or a special coding such as a delay in one of the binary streams or an insertion of a specific binary word, so as to resolve phase ambiguity in a transcoder in the receiving part. The complexity of the transcoder increases in terms of the number I of phase states and affects at least half of the cost of the modem. Transcoding also multiplies the number of errors.

OBJECTS OF THE INVENTION

The main object of this invention is to simplify the composition of known modems by making the carrier wave synchronous with the clock signal in the transmitting part and, consequently, by recovering a carrier wave in the receiving part having a phase coherent with the clock signal in the transmitting part.

Another object of this invention is to suppress the transcoding operations in the transmitting and receiving parts according to the prior art.

A further object of this invention is to reduce the weight and cost of the modem to enhance the reliability of the modem.

SUMMARY OF THE INVENTION

In accordance with these objects, there is provided an arrangement for recovering carrier and clock frequencies in a digital transmission system comprising:

in a transmitting part,
  means for multiplying a frequency 1/T of a clock signal provided with a binary signal by a predetermined ratio n into a carrier wave frequency P, and
  means receiving said binary signal, clock signal and carrier wave for modulating in phase or amplitude said carrier wave by said binary signal into a modulation signal having $I=2^J$ possible phase or amplitude states corresponding to combinations of J consecutive bits in said modulating binary signal, said modulation signal having a modulation frequency $1/\tau$ equal to 1/JT, and in a receiving part,
  means for delaying said modulation signal by a time equal to half the modulation period $\tau$ to provide a delayed modulation signal,
  means for summing said modulation signal and said delayed modulation signal into a summation signal,
  means for full-wave rectifying said summation signal into a rectified signal,
  phase locked means receiving said rectified signal for recovering said carrier wave frequency and clock signal frequency, and
  means receiving said recovered carrier wave and clock signal for phase or amplitude demodulating said modulation signal into said binary signal.

According to the invention, the error rate is whittled down since the transcoding operation multiplying errors is done away with. The immunity to noise is improved as a result of it being possible to achieve a coherent demodulation. Clock recovery is more straightforward: a single clock restitution is sufficient instead of J clock restitutions, thereby improving jitter behavior.

BRIEF DESCRIPTION OF THE DRAWING

Other features and advantages of this invention will be more clearly from the following more particular description of preferred embodiments of this invention in reference to the corresponding accompanying drawings in which.

DESCRIPTION OF THE PREFERRED EMBODIMENTS

With reference to FIGS. 1 to 5, a description is given of a carrier frequency and clock frequency recovery arrangement in a quadriphase modulation and coherent demodulation digital transmission system. The arrangement concerns a transmitting part 1 and a receiving part 2 in a modem.

Figure 1:
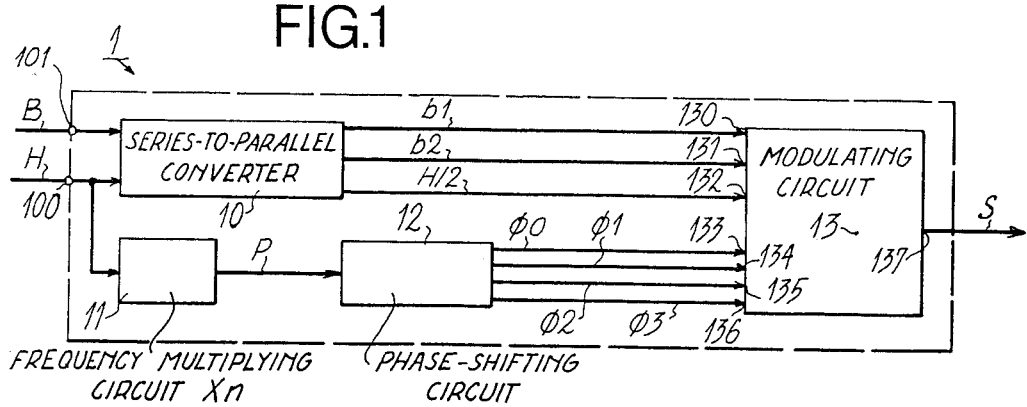
FIG. 1 is a schematic block diagram of a transmitting part performing a quadriphase modulation embodying the invention.

The transmitting part 1 depicted in FIG. 1 comprises a series-to-parallel converter 10, a frequency multiplying circuit 11, a phase-shifting circuit 12 and a modulating circuit 13.

Figure 2:
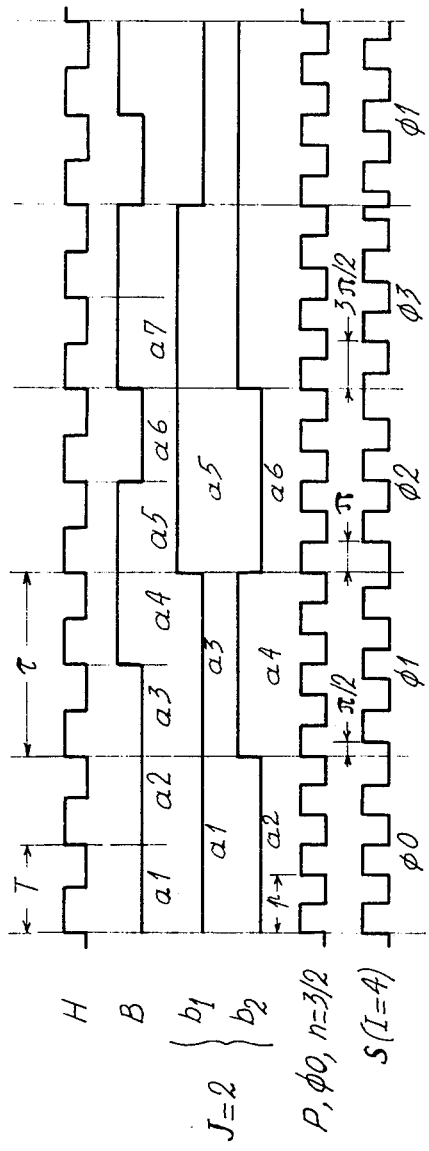
FIG. 2 is a diagram of waveforms of logic signals inherent to a quadriphase modulation in the transmitting part.

Two input terminals 100 and 101 of converter 10 receive in synchronism a clock signal H and a serialized information binary signal B shown on first and second lines in FIG. 2, respectively. The clock signal H carries a period T equal to a period of the binary signal B. Converter 10 demultiplexes the binary signal B into two synchronous binary streams b1 and b2 corresponding respectively to odd and even rank bits of signal B as shown on third and fourth lines in FIG. 2. Each of bits in streams $b_1$ and $b_2$ occupies an elementary interval $\tau$ equal to 2T, called modulation period. Converter 10 further restitutes a clock signal H/2 with a period 2T. Streams $b_1$, $b_2$ and clock signal H/2 are fed into three inputs 130, 131 and 132 of modulating circuit 13, respectively.

Input terminal 100 is also connected to an input of frequency multiplying circuit 11. Circuit 11 multiplies frequency 1/T of the clock signal H by a factor n to restitute a carrier wave P having a frequency n/T. Depending on the value of the factor n, circuit 11 derives the carrier P differently. If $n<1$, circuit 11 is a conventional frequency divider in which the division is obtained by logic circuits. If n is an integer greater than unity, circuit 11 contains an analog multiplier or a phase locked loop. If n is a fraction greater than unity, circuit 11 contains preferably a phase locked loop. In all events, the carrier P is directly derived from the clock signal H and is synchronous therewith. In the embodiment shown, it is assumed, as depicted on a fifth line in FIG. 2, that the factor n is equal to 3/2 and that the carrier P takes the shape of a 0.5 cyclic ratio pulse signal. The carrier can however be a sine wave. Thus in this embodiment, the modulation period $\tau=2T$ is equal to three periods p of the carrier P.

From the carrier P derived in circuit 11, phase shifting circuit 12 derives four digital signals $\phi 0$, $\phi 1$, $\phi 2$ and $\phi 3$ having a same frequency n/T and applied to four inputs 133, 134, 135 and 136 of modulating circuit, respectively. Signals $\phi 0$, $\phi 1$, $\phi 2$ and $\phi 3$ are derived from the carrier P and are phase shifted with respect to carrier P by 0, $\pi/2$, $\pi$, and $3\pi/2$ respectively in order to produce a quadriphase modulation signal S in circuit 13. The four pairs of bits in streams $b_1$ and $b_2$ such as 00, 01, 10 and 11 have corresponding to them in signal S elements of the carrier P having a time $\tau$, made up of the respective phase-shifted signals $\phi 0$, $\phi 1$, $\phi 2$ and $\phi 3$. The modulation signal S leaving output 137 from modulating circuit 13 is shown on a last line in FIG. 2.

Figure 3:
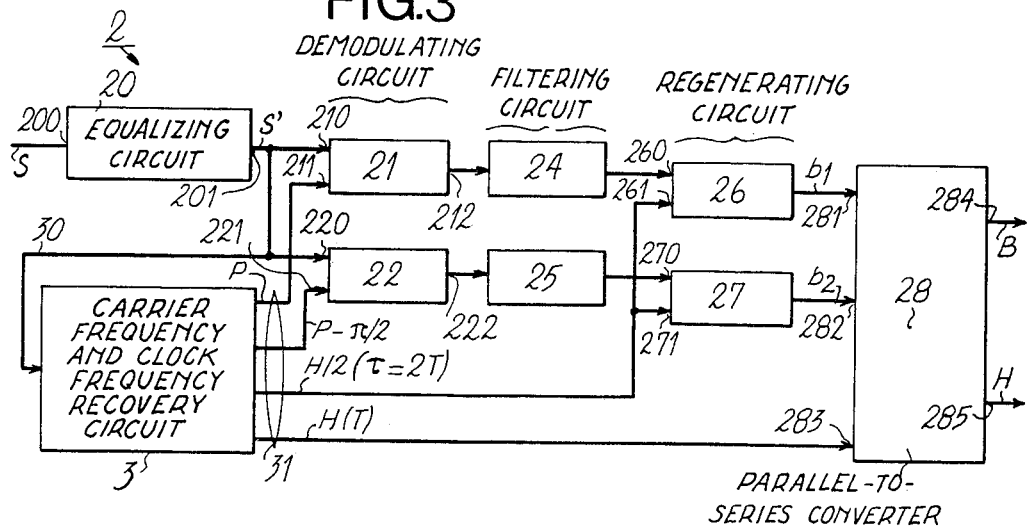
FIG. 3 is a schematic block diagram of a receiving part performing a quadriphase demodulation embodying the invention.

The receiving part 2 is shown in FIG. 3. The modulation signal S transmitted from transmitting part 1 is received at input 200 of an equalizing circuit 20. Circuit 20 performs in particular a compensation operation on amplitude and phase distorsions stemming from a transmission medium carrying the signal S between parts 1 and 2, and band-pass filtering and preamplifying of a channel in which the signal S is transmitted. The transmission medium can be a cable or optical fiber line, or a radio link. An equalized signal S' delivered by output 201 of circuit 20 is fed into inputs 210 and 220 of demodulating circuits 21 and 22 and to input 30 of a carrier frequency and clock frequency recovery circuit 3. Circuit 3 recovers a carrier having a phase perfectly known with respect to the carrier derived in transmitting part 1. Using the recovered carrier, an output bus 31 from circuit 3 delivers two recovered carriers in quadrature P and P-$\pi$/2 to other two inputs 211, 221 of demodulating circuits 21, 22 such that outputs 212 and 222 of circuits 21 and 22 restitute two demodulated signals containing the binary information corresponding to binary streams $b_1$ and $b_2$ processed in transmitting part 1. The demodulated signals are then fed to two filtering circuits 24 and 25 that suppress any demodulation remnants and filter the demodulated signals according to the Nyquist criterion. Filtered signals leaving circuits 24 and 25 are fed to inputs 260, 270 of two regenerating circuits 26 and 27 having other inputs 261 and 271 receiving a clock signal H/2 recovered at modulation frequency $1/\tau=1/(2T)$ supplied by output bus 31 from circuit 3. Regenerated binary streams $b_1$ and $b_2$ are applied to two inputs 281, 282 of a parallel-to-series converter 28 having another input 283 receiving the recovered clock signal H at the clock frequency 1/T supplied by output bus 31 from circuit 3. Converter 28 performs an opposite operation to converter 10 and derives at an output 284 the initial information binary signal B accompanied by the clock signal H on another output 285.

By comparison with the prior art, in the receiving part, the carrier wave P was produced independently of the clock signal, e.g. by a local oscillator, and thus was not in synchronism with the clock signal. To know a reference phase of the carrier in the receiving part, the transmitting part according to the prior art included a $b_1$ and $b_2$ binary stream transcoder interconnected between circuits 10 and 13 and generally performing a differential modulation. In the receiving part as in the prior art, a carrier recovery circuit recovered solely the carrier wave with no means of recovering the clock signal H, since based on the modulated signal received, a carrier may be recovered by multiplying by 4 and then dividing by 4 in frequency without the recovered carrier phase being perfectly determined with respect to the carrier phase in the transmitting part. This indetermination is reflected by a phase shift equal to an integer multiple of $\pi/2$ between the recovered carrier and the carrier in the transmitting part. Any phase ambiguity due to reconstitution of the carrier was then resolved by means of a transcoder interconnected between circuits 26 and 27 and circuit 28. The clock signal was recovered from the demodulated signals at the outputs from circuits 24 and 25.

Figure 4:
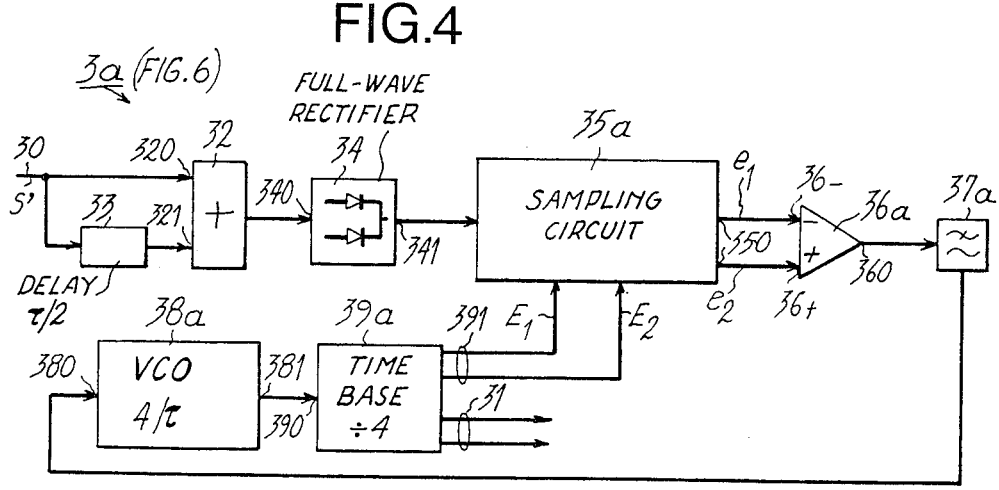
FIG. 4 is a functional block diagram of a carrier frequency and clock frequency recovery circuit included in the receiving part according to a first embodiment.
Figure 5:
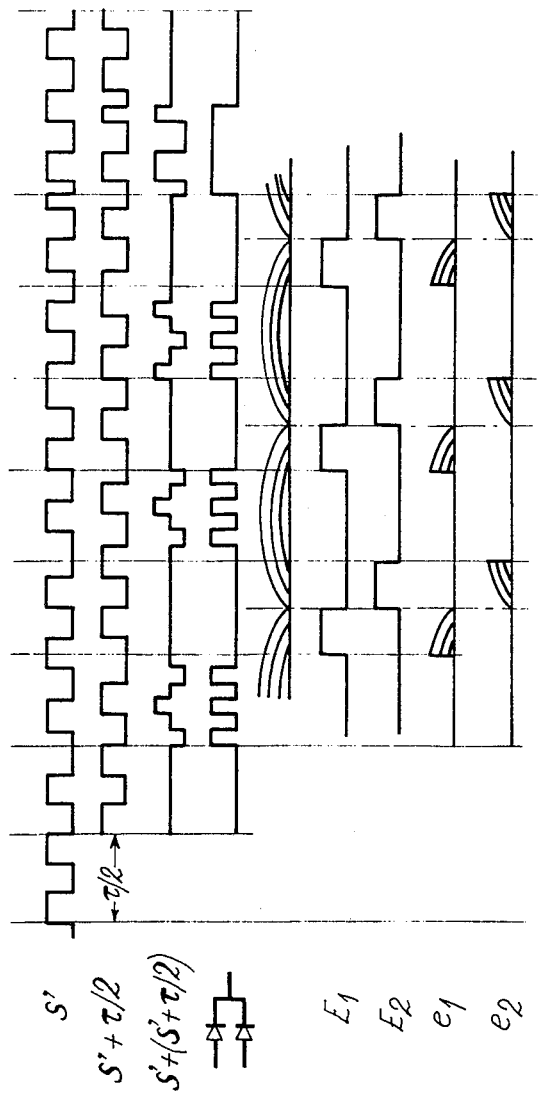
FIG. 5 is a diagram of waveforms of logic and analog signals derived in the recovery circuit in FIG. 4.

FIGS. 4 and 5 illustrate a carrier frequency and clock frequency recovery circuit 3a according to a first embodiment. The modulation signal S' supplied by circuit 20 to input 30 is fed directly to a first input 320 of an analog summing circuit 32 and via a delay circuit 33 to a second input 321 of circuit 32. Delay circuit 33 introduces a delay equal to $\tau/2$ and supplies a delayed signal $S'+\tau/2$ shown in a second line of FIG. 5. Summing circuit 33 is supposed here to be an analog adder that adds the signals S' and $S'+\tau/2$ into a summation signal $S'+(S'+\tau/2)$ fed to input 340 of a full-wave rectifier 34. As shown in a third line of FIG. 5, the summation signal at input 340 of rectifier 34 is a 3-level signal. In a first half-period $\tau/2$ of each modulation period, the summation signal results from the sum of two carrier elements phase-shifted by 0, $\pi/2$, $\pi$ or $3\pi/2$. In a second half period $\tau/2$, of each modulation period, the summation signal results from the sum of two carrier elements phase-shifted by $\pi$ by means of delay circuit 33. An output 341 of rectifier 34 supplies a rectifier signal shown on a fourth line in FIG. 5. In the second half-periods of the rectified signal is derived a constant level reduced to zero whatever the sequence of carrier elements, i.e. whatever the make-up of the initial binary signal B. The zero level is equivalent to an energy zero in a fifth line of FIG. 5. The energy zero is recurrent every period $\tau$ and occurs in each modulation period $\tau$ at a predetermined position, in this case, three-quarters from the start of each modulation period $\tau$.

However, depending on the factor n, summing circuit 32 can be composed of an analog subtracter without altering the carrier recovery method as set forth in the invention. Indeed, the carrier P keeps a constant phase in an elementary modulation interval $\tau$. Depending on whether the ratio 2n between the carrier P frequency and the modulation frequency $1/\tau$ is odd or even, an addition or subtraction operation must be performed between signal S' and delayed signal $S'+\tau/2$. Under these conditions appears an energy zero having a period $\tau$, hence a component having a frequency $1/\tau$.

Other circuits included in carrier frequency and clock frequency recovery circuit 3a are equivalent to a slaved loop designed primarily for filtering or synthesizing the carrier from the periodic energy zero at output 341. The carrier phase thus filtered is perfectly determined with respect to the carrier reference phase in the transmitting part. Produced then from the recovered carrier are particularly clock signals needed to regenerate the binary signal B.

The other aforementioned circuits are arranged in a phase locked loop 35a to 39a in accordance with the first embodiment shown in FIG. 4. A sampling circuit 35a receives the rectified signal from output 341 of rectifier 34 and samples the rectified signal on either side of the energy zeros under the control of logic sampling signals $E_1$ and $E_2$ provided at two outputs 391 from a time base 39a, as depicted on sixth and seventh lines in FIG. 5. Signals $E_1$ and $E_2$ have a period $\tau$ and carry pulses having a duration $\tau/4$ on either side of the energy zeros. The signals $E_1$ and $E_2$ are derived from the recovered carrier in time base 39a. Two outputs 350 of sampling circuit 35a supply two sample signals $e_1$ and $e_2$, as shown in last two lines in FIG. 5, that are respectively fed to inputs $36_-$ and $36_+$ of a differential amplifier 36a having an output 360 connected to a low pass filter 37a. Signals $e_1$ and $e_2$ carry a continuous component that reflects the phase shift between the rectified signal provided from output 341 of the rectifier, as depicted on the fifth line in FIG. 5, and the signals $E_1$ and $E_2$ outputting from time base 39a. Through differential processing in amplifier 36a and low pass filtering in filter 37a in an error signal produced as required for the slaved loop to operate. In all, sampling circuit 35a and differential amplifier 36a together form an analog phase comparator. A filtered signal leaving filter 37a is then fed to control input 380 of a voltage controlled oscillator 38a oscillating at a frequency $4/\tau$ with a phase cued to that of the signal from output 341. An output 381 of oscillator 38a supplies a signal having a frequency $4/\tau$ to input 390 of time-base 39a which, as already stated, produces the sampling control signals $E_1$ and $E_2$ and recovered carrier and recovered clock signals having frequencies $1/\tau$, $n/\tau$, $1/T$ and $2/T$ on two outputs 391 connected to sampling circuit 35a and on bus 31 connected to demodulating circuits 21 and 22, regenerating circuits 26 and 27 and parallel-to-series converter 28 (FIG. 3).

It is to be noticed that the method of recovering the carrier as in the invention, performed essentially by the functions of circuits 32, 33 and 34, is applicable to phase or amplitude modulations of a digital signal whatever the number of phase or amplitude states. More precisely, the method of the invention can be applied to any modulated signal provided by phase modulating a carrier wave defined by $I=2^J$ phase states corresponding respectively to I possible combinations of J consecutive bits in the binary signal B, and can further be applied to any modulated signal provided by amplitude modulating a carrier wave defined by $I=2^J$ amplitude states corresponding respectively to the I possible combinations of J consecutive bits in the binary signal B. By way of an example, for four amplitude states $+3$, $-3$, $+1$ and $-1$, the signal S' is composed of two elementary intervals containing a carrier having a peak-to-peak amplitude between $-3$ and $+3$ which two phases 0 and $\pi$ respectively and two elementary intervals containing a carrier having a peak-to-peak amplitude between $+1$ and $-1$ with two phases 0 and $\pi$ respectively. Processing of the carrier at output 341 from the rectifier 34 is then independent of the phase or amplitude modulation. In what follows, with reference to FIGS. 6 to 9, the signal S' is considered in phase or amplitude modulation independently.

It can further be noted that the delay value $R=\tau/2$ is different from the delay equal to $\tau$ used for a known differential demodulation of each of streams $b_1$ and $b_2$.

Figure 6:
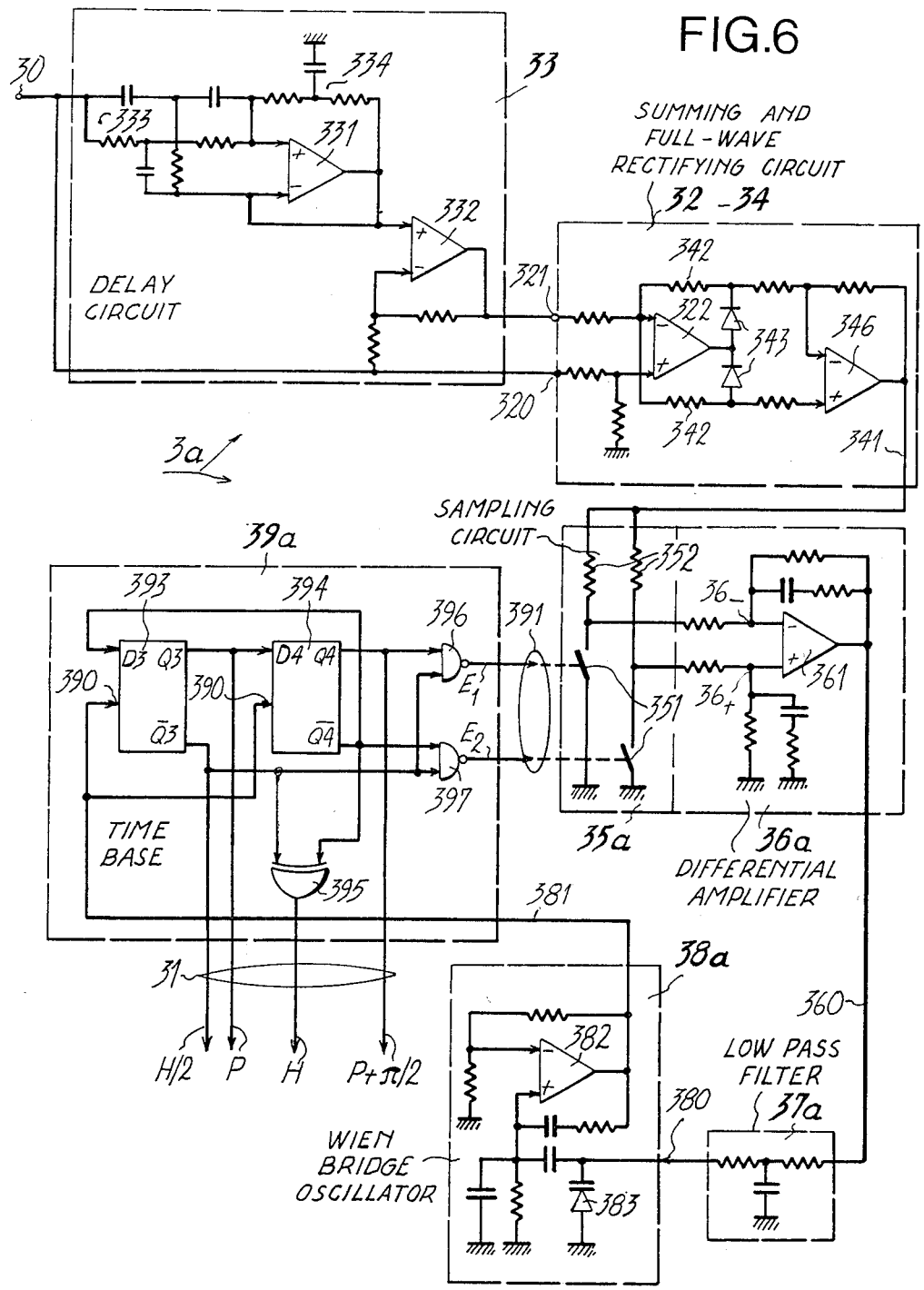
FIG. 6 is a more detailed block diagram of the recovery circuit in FIG. 4.

FIG. 6 details the carrier frequency and clock frequency recovery circuit 3a for a clock frequency $1/T=152$ kHz, a factor $n=0.5$ and hence a carrier frequency $P=76$ kHz. The modulation period is therefore $\tau=2T=p$. In FIG. 6, circuits 32 to 39a are shown in detail.

Delay circuit 33 consists of an all-pass filter with two operational amplifiers 331 and 332 in cascade, and delays the signal S' by $\tau/2$. Amplifier 331 is provided in input with a double-T cell 333 and in feedback with a T cell 334. An output of amplifier 332 and input 30 of the recovery circuit 3a are respectively connected to two input terminals 321 and 320 of an analog operational-amplifier subtracting circuit 322 included in circuits 32 and 34. The operational amplifier in circuit 322 is provided with two feedback loops each consisting of a resistor 342 and a diode 343. Diodes 343 are oppositely poled. Amplifier circuit 322 thus operates both as a subtractor to supply the summation signal $S'-(S'+\tau/2)$ and as a half-wave rectifier. Rectified signals at the common terminals of resistors 342 and diodes 343 are then subtracted in an operational-amplifier subtractor 346 having an output 341 delivering the full-wave rectified signal.

Sampling circuit 35a in circuit 3a comprises two switches 351. Each switch 351 is connected in series with a resistor 352 between output 341 from amplifier 346 of summing and rectifying circuit 32-34 and ground. A common terminal on each resistor 352 and respective switch 351 is connected via an input resistor to one of terminals $36_-$, $36_+$ of an operational amplifier 361 included in differential amplifier 36a. Switches 351 bring about sampling according to the timing diagrams in the last four lines of FIG. 5. The differential processing in amplifier 361 provides an analog phase comparison. The low pass filtering operation in circuits 36a and 37a is performed before closing the phase locked loop on oscillator 38a.

Oscillator 38a is a Wien bridge oscillator including an operational amplifier 382 and a variable capacitance diode 383 for cueing to frequency $4/\tau=304$ kHz. The frequency signal $4/\tau$ at output 381 from amplifier 382 is fed to clock inputs 390 of two D-type bistable flip-flops 393 and 394 included in time-base 39a. A complementary output $\overline{Q}4$ of second flip-flop 394 is connected to input D3 of first flip-flop 393. Output Q3 of flip-flop 393 is connected to input D4 of flip-flop 394. Signals from outputs Q3 and Q4 or $\overline{Q}3$ and $\overline{Q}4$ of both flip-flops 393 and 394 are therefore in quadrature with a frequency $1/\tau=76$ kHz. One of two inputs of each of two NAND gates 396 and 397 included in time base 39a is connected to output $\overline{Q}3$ of first flip-flop 393. Other inputs of gates 396 and 397 are respectively connected to outputs Q4 and $\overline{Q}4$ of second flip-flop 394. Outputs 391 of gates 396 and 397 provide the sampling control signals $E_1$ and $E_2$ shown in the sixth and seventh lines of FIG. 5 to control both switches 351. Outputs Q3 and Q4 are connected to the second inputs of modulating circuits 21 and 22 to provide the two carriers P and $P+\pi/2$ restituted in quadrature and used for demodulation. Outputs Q3 and Q4 are connected to inputs of an OR-Exclusive gate 395 having an output delivering the clock signal H with a frequency $2/\tau=1/T$ with a view to transmitting the signal H jointly with the signal H/2 at output Q3 to inputs 283, 261 and 271 of circuits 28, 26 and 27 (FIG. 3).

Figure 7:
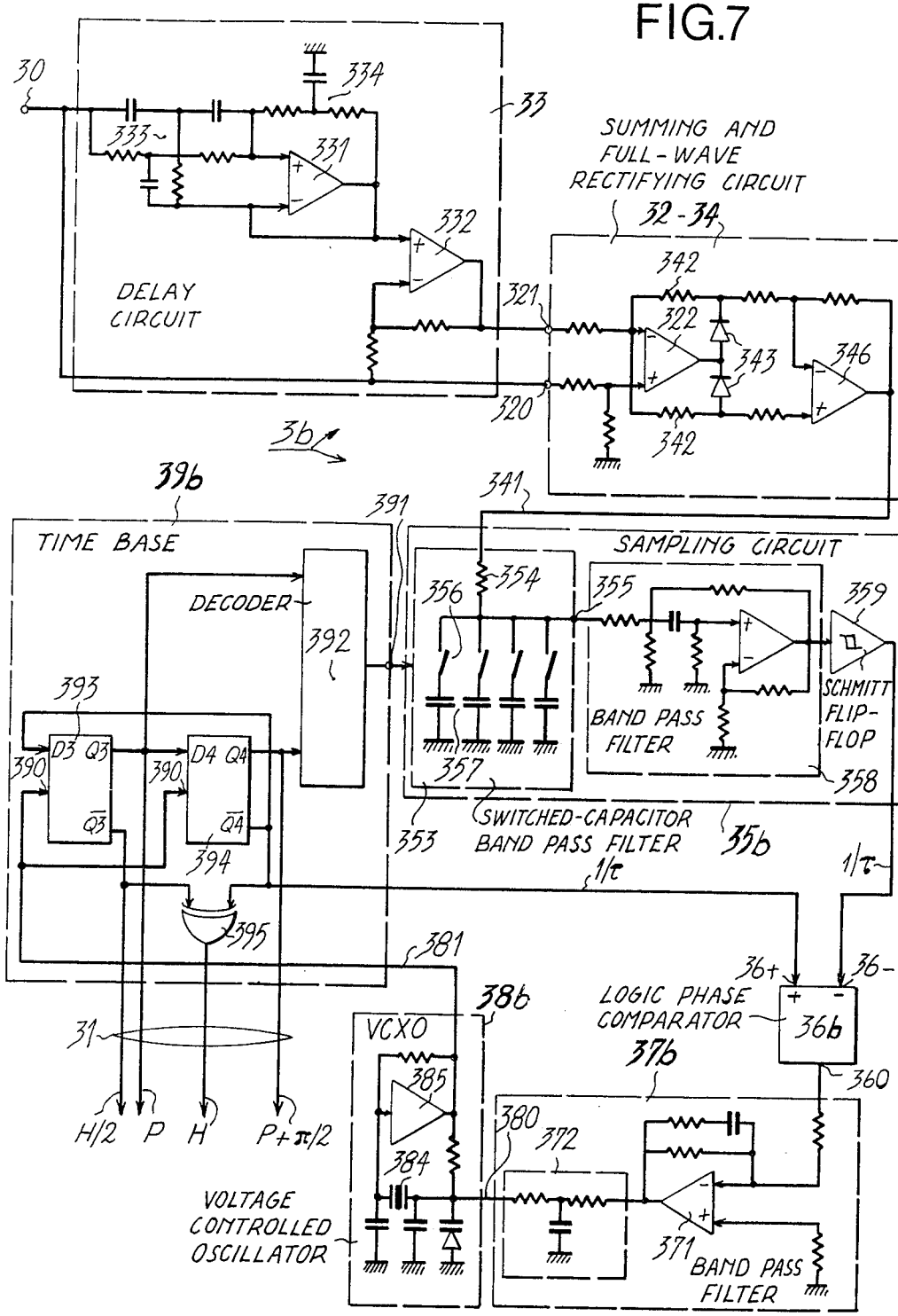
FIG. 7 is a detailed block diagram of a carrier frequency and clock frequency recovery circuit according to a second embodiment slightly different from the first embodiment.

A second embodiment of a circuit 3b recovering the carrier frequency and clock frequency from a phase of amplitude modulated signal S' is depicted in detail in FIG. 7. The clock frequency 1/T and carrier frequency P are equal to 152 kHz and 76 kHz respectively as for the first embodiment in FIG. 6. Circuit 3b comprises, after input 30, a delay circuit 33 and a summing and full-wave rectifying circuit 32-34 all identical to those already described in reference to FIG. 6. Circuit 3b differs from circuit 3a essentially as regards the structure of phase locked loop 35b-39b that comprises a logic phase comparator 36b equivalent to an OR-Exclusive operator.

Sampling circuit 35b consists mainly of a switched-capacitor band pass filter 353 tuned to the frequency 76 kHz. Filter 353 comprises an RC network having a resistor 354 interconnected between output 341 of amplifier 346 and an output terminal 355 of filter 353. Terminal 355 is common to four parallel capacitor arrays included in filter 353. Each capacitor array is composed of a switch 356 and a capacitor 357 connected in series between terminal 355 and ground. Sampling at frequency $1/\tau$ is performed by successively closing four switches 354 for a time $\tau/4$. The closing operations are controlled by output bus 391 from a decoder 392 included in time base 39b and receiving quadrature control signals Q3 and Q4 with a period $\tau$ derived in time base 39b. Output terminal 355 of filter 353 is connected to an operational-amplifier type second-order band pass filter 358 suppressing any sampling remnants. The arrangement of filters 353 and 358 offers a narrow pass band centered on the modulation frequency $1/\tau=76$ kHz, equal here to the carrier frequency. A Schmitt flip-flop 359 is provided between an output of the operational amplifier in filter 358 and an input $36_-$ of phase comparator 36b. Flip-flop 359 restores a filtered signal with the modulation frequency in the form of pulses. Another input $36_+$ of phase comparator 36b is connected to an output Q4 of a flip-flop 394 in time base 39b delivering a signal with the modulation frequency $1/\tau$. Time base 39b comprises two D-type flip-flops 393 and 394 and an OR-Exclusive gate 395 that are arranged in a like manner to time base 39a in FIG. 6.

Band pass filter 37b comprises an active filter including an operational amplifier 371 connected to output 360 of phase comparator 36b, and a low pass cell 372 connected to an output of amplifier 371. A filtered error signal is fed to control input 380 of oscillator 38b. Oscillator 38b is a conventional voltage controlled oscillator VCXO comprising a quartz 384 and an operational amplifier 385. Output 381 from amplifier 385 is connected to clock inputs 390 of flip-flops 393 and 394 in time base 39b.

Two other embodiments of the carrier frequency and clock frequency recovery circuit are described with reference to FIGS. 8 and 9. The corresponding recovery circuits 3c and 3d are based on the same principle as circuit 3a in FIG. 4, namely with carrier restitution by delay, addition and rectification. Circuits 3c and 3d therefore comprise from input 30, summing circuit 32, delay circuit 33 and full-wave rectifier 34 arranged in a like manner to circuit 3a.

Figure 8:
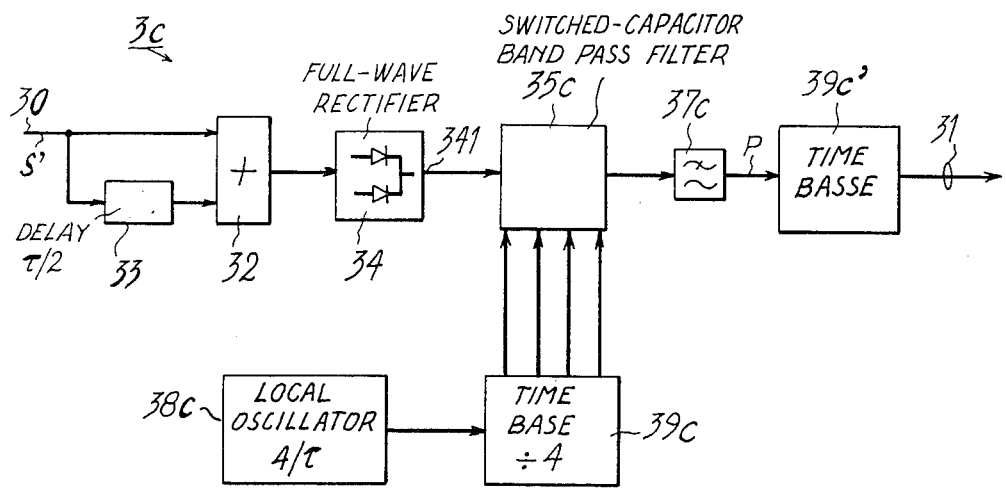
FIG. 8 is a block diagram of a carrier frequency and clock frequency recovery circuit according to a third embodiment.

With reference to FIG. 8, the phase locked loop 35a to 39a in FIG. 4 is replaced by a local oscillator 38c, a time base 39c performing a frequency division by 4, and a four switched-capacitor band pass filter 35c. Local oscillator 38c provides a signal with frequency $4/\tau$. Time base 39c divides the frequency of the signal leaving oscillator 38c by 4 and provides four sampling control signals with a frequency $1/\tau$ and phase shifted by $\tau/2$ with respect to each other. Filter 35c samples the rectified signal from output 341 of rectifier 34 under the control of time base 39c. A sampled signal outputting filter 35c is low-pass filtered in a filter 37c restituting the carrier wave P based on which the signals needed for demodulation and the clock signals H and H/2 are derived in a time base 39c' and transmitted in bus 31. Circuits 35c, 37c, 38c and 39c are analogous to circuits 35b, 37b, 38b and 39b depicted in detail in FIG. 7, respectively.

In the circuit 3c shown in FIG. 8, the carrier wave is directly filtered. In the first embodiment (FIG. 4), carrier wave synthesis is used with phase cueing with respect to the signal at output 341 from rectifier 34; under these conditions, phase slip is always possible. Circuit 3c in FIG. 8 obviates this drawback but the generation of clock frequencies H and H/2 does make a second time base 39c' necessary.

Figure 9:
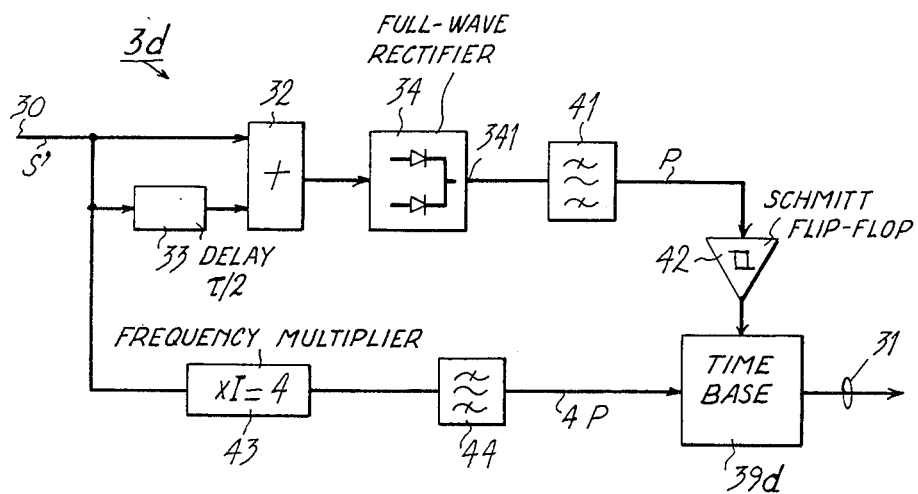
FIG. 9 is a block diagram of a carrier frequency and clock frequency recovery circuit according to a fourth embodiment.

In the fourth embodiment, carrier frequency and clock frequency recovery circuit 3d depicted in FIG. 9 offers first and second parallel paths.

The first path, after input 30, comprises the array of circuits 32, 33 and 34, a band pass filter 41 having a narrow bandwidth and a Schmitt flip-flop 42. Filter 41 is tuned to the frequency p and restitutes the carrier P shaped by flip-flop 42. Pulses outputting flip-flop 42 offer rise fronts used to set in phase a divide-by-4 frequency divider included in a time base 39d.

The second path, after input 30, comprises a frequency multiplier 43 that multiplies carrier frequency by I=4, and a band pass filter 44. Multiplier 43 suppresses the phase modulation in the signal S' and filter 44 restitutes a pure signal with frequency 4P in terms of which time base 39c derives the corresponding signals in bus 31 by means of frequency divisions.

The fourth embodiment offers the advantage that time base 39d continuously receives a signal with frequency IP that is independent of the state of the modulation elements in the signal S', i.e. the state of the bits in signal B. No clock frequency loss occurs in time base 39d. On the contrary, recovery circuits 3a, 3b and 3c are dependent on the statistics regarding binary signal B and to be more precise, long successions of bits with the same binary state that produce a constant energy level in the rectified signal (FIG. 5, fourth and fifth lines); the constant energy level prevents the carrier from being reconstituted by phase comparison and filtering. The clock or timing loss is avoided in circuit 3d since the carrier P shaped by flip-flop 42 serves solely in locking the phase in time base 39d. When using circuit 3d, no scrambler is needed in the transmitting part and no discrambler in the receiving part to pseudo-randomize the modulation signal, as used to be the case in the prior art.

Although several embodiments of the invention has been disclosed herein, it will be apparent to those of ordinary skill in the art that the disclosed embodiments may be modified inside the scope of the appended claims.

What I claim is:

1. An arrangement for recovering carrier and clock frequencies in a digital transmission system comprising:
   in a transmitting part,
      means for multiplying a frequency 1/T of a clock signal provided with a binary signal by a predetermined ratio n into a carrier wave frequency P, and
      means receiving said binary signal, clock signal and carrier wave for modulating in phase of amplitude said carrier wave by said binary signal into a modulation signal having $I=2^J$ possible phase or amplitude states corresponding to combinations of J consecutive bits in said modulating binary signal, said modulation signal having a modulation frequency $1/\tau$ equal to 1/JT, and
   in a receiving part,
      means for delaying said modulation signal by a time equal to half the modulation period $\tau$ to provide a delayed modulation signal,
      means for summing said modulation signal and said delayed modulation signal into a summation signal,
      means for full-wave rectifying said summation signal into a rectified signal,
      phase locked means receiving said rectified signal for recovering said carrier wave frequency and clock signal frequency, and
      means receiving said recovered carrier wave and clock signal for phase or amplitude demodulating said modulation signal into said binary signal.

2. The arrangement claimed in claim 1, wherein said delay means includes an all-pass filter with two operational amplifiers.

3. The arrangement claimed in claim 1 wherein said summing means and said rectifying means include an operational amplifier operating as an adder or subtractor and having two diode feedback paths for full-wave rectification, and an operational amplifier having two imputs connected respectively to said diodes and operating as a substractor.

4. The arrangement claimed in claim 1, wherein said phase locked means comprises means for sampling said rectified signal, means for differentially processing sample signals derived by said sampling means, means for low pass filtering a differential signal outputting from said differentially processing means, a voltage controlled oscillator controlled by a filtered signal outputting from said low pass filtering means, said oscillator oscillating at a frequency multiple of said modulation frequency, and a time base connected to an output of said oscillator for deriving sampling control signals to control said sampling means and recovered carrier wave frequency signals and recovered clock signals to be supplied into said demodulating means.

5. The arrangement claimed in claim 1 wherein said phase locked means comprises means for sampling and band pass filtering said rectified signal into a logic signal having said modulation frequency, phase comparing means having a first input receiving said logic signal, band pass filtering means connected to an output of said phase comparing means, a voltage controlled oscillator connected to an output of said band pass filtering means and oscillating at a frequency multiple of said modulation frequency, and a time base connected to an output of said oscillator for deriving sampling control signals to control said sampling means, a signal having said modulation frequency to be fed to a second input of said phase comparing means, and recovered carrier wave frequency signals and recovered clock signals to be supplied into said demodulating means.

6. The arrangement claimed in claim 5 wherein said sampling and band pass filtering means comprises a switched-capacitor band pass filter receiving said rectified signal and controlled by said sampling control signals, a band pass filter connected to an output of said switched-capacitor band pass filter, and a Schmitt flip-flop connected to an output of said band pass filter.

7. An arrangement for recovering carrier and clock frequencies in a digital transmission system comprising:
   in a transmitting part,
      means for multiplying a frequency 1/T of a clock signal provided with a binary signal by a predetermined ratio n into a carrier wave frequency P, and means receiving said binary signal, clock signal and carrier wave for modulating in phase of amplitude said carrier wave by said binary signal into a modulation signal having $I=2^J$ possible phase or amplitude states corresponding to combinations of J consecutive bits in said modulating binary signal, said modulation signal having a modulation frequency $1/\tau$ equal to $1/JT$, and in a receiving part, means for delaying said modulation signal by a time equal to half the modulation period $\tau$ to provide a delayed modulation signal, means for summing said modulation signal and said delayed modulation signal into a summation signal, means for full-wave rectifying said summation signal into a rectified signal, a local oscillator oscillating at a frequency multiple of said modulation frequency, frequency dividing means connected to an output of said oscillator for deriving sampling control signals, means controlled by said sampling control signals for sampling and band pass filtering said rectified signal into a sampled signal, means for low pass filtering said sampled signal into a recovered carrier wave, a time base receiving said recovered carrier wave for deriving for recovering carrier wave frequency signals and recovered clock signals, and means receiving said recovered carrier and clock signals for demodulating said modulation signal into said binary signal.

8. The arrangement claimed in claim 7 wherein said sampling and band pass filtering means comprises a switched-capacitor band pass filter receiving said rectified signal and controlled by said sampling control signals, a band pass filter connected to an output of said switched capacitor band pass filter, and a Schmitt flip-flop connected to an output of said band pass filter.

9. An arrangement for recovering carrier and clock frequencies in a digital transmission system comprising:

in a transmitting part, means for multiplying a frequency $1/T$ of a clock signal provided with a binary signal by a predetermined ratio n into a carrier wave frequency P, and means receiving said binary signal, clock signal and carrier wave for modulating in phase or amplitude said carrier wave by said binary signal into a modulation signal having $I=2^J$ possible phase or amplitude states corresponding to combinations of J consecutive bits in said modulating binary signal, said modulating signal having a modulation frequency $1/\tau$ equal to $1/JT$, and in a receiving part, means for delaying said modulation signal by a time equal to half the modulation period $\tau$ to provide a delayed modulation signal, means for summing said modulation signal and said delayed modulation signal into a summation signal, means for full-wave rectifying said summation signal into a rectified signal, means for band pass filtering said rectified signal into a recovered carrier wave, means for multiplying in frequency by I said modulation signal into a IP-frequency signal, means for band pass filtering said IP-frequency signal into a filtered IP-frequency signal, a time base set in phase by said recovered carrier wave for deriving, as a function of said filtered IP-frequency signal, recovered carrier wave frequency signals and for recovering clock signals, and means receiving said recovered carrier and clock signals for demodulating said modulation signal into said binary signal.

* * * * *